United States Patent Office 3,775,311
Patented Nov. 27, 1973

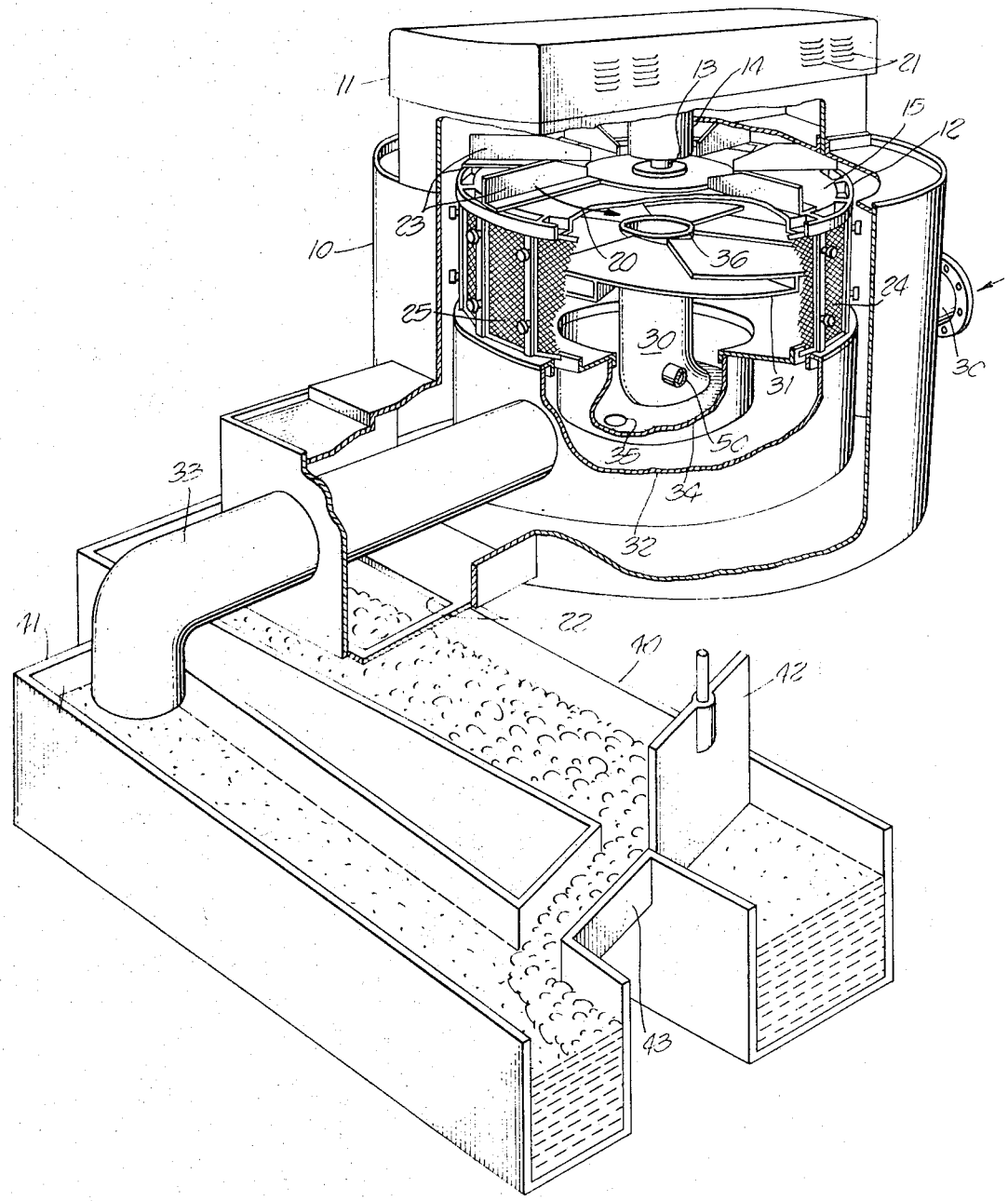

3,775,311
SCREENING AERATOR CONCENTRATOR
Philip H. Mook, Huntington Beach, and Theodore R. Westfall, Burbank, Calif., assignors to Sweco, Inc., Los Angeles, Calif.
Filed May 6, 1971, Ser. No. 140,929
Int. Cl. B03d 1/00
U.S. Cl. 210—44                                 12 Claims

ABSTRACT OF THE DISCLOSURE

An apparatus for separating waste water into a waste containing concentrate and a relatively waste free effluent is disclosed. The apparatus comprises a fine mesh rotating screening aerator combined with a froth flotation system. New methods for concentrating waste water are also disclosed utilizing separation by a combination of a rotating aerating screen with froth flotation procedures, as well as concentrating waste water and enhancing the entry of air to the apparatus to increase the dissolved and entrained oxygen in the effluent.

BACKGROUND OF THE INVENTION

The field of invention relates to devices and methods of separating a particulate-containing influent into a relatively particulate-free stream and particulate-containing concentrate. Separations of this nature are particularly useful in waste water treatment, particularly waste water resulting from combined sewers. Combined sewers are those which receive all types of waste flows, including storm water, for ultimate treatment at a treatment facility. During heavy rain storms, overflow conditions are often unavoidable and the result is that a substantial amount of the waste stream cannot be treated. This results in a major source of water pollution since a portion of the waste will not receive any treatment at all. Any treatment plant intended for service on storm overflow will, by its very nature be used intermittently. The conventional biological processes are most effective for steady flow conditions and thus a system which can operate intermittently is highly desirable.

In the past the process of froth flotation has been used for waste water treatment by a dissolved air flotation system wherein waste water and air are placed in intimate contact under a pressure of about 50 p.s.i.g. and from there passed through a valve into a flotation cell operating at atmospheric pressure. This decrease in pressure causes an escape of dissolved gases thereby resulting in a froth which is skimmed from the surface.

Recently, a new rotary screen separator has been utilized to concentrate the waste water so that substantially all of the particulate solid waste may be treated. One such rotating screen separator is disclosed in a U.S. patent application filed by Philip H. Mook, one of the present inventors, on June 1, 1970, Ser. No. 42,099 entitled Rotating Screen Separator, now abandoned in favor of continuation application Ser. No. 210,179. The disclosure of this application is incorporated by reference herein. The present invention constitutes an improvement over this basic apparatus and the method of using it.

CROSS REFERENCE TO RELATED APPLICATION

Reference is made to an application entitled Screening and Aerating Concentrator, filed concurrently herewith in the name of Robert P. Miller, Jr., Ser. No. 140,916, which application is assigned to the assignee of the present application and the disclosure of which is incorporated herein by reference.

SUMMARY OF THE INVENTION

It has been discovered that a rotating screen separator may be utilized as a froth producing device. This apparatus, a rotating screening aerator, when combined with means for separating the froth from the relatively waste free effluent, results in a particularly clean effluent. An inherent difficulty with any screen separating process is that a significant number of fine particles which are smaller than the screen mesh openings simply pass through the screen and are, therefore, not separated from the waste-containing influent. Froth flotation, however, is capable of removing very small particles, particularly those smaller than 300 microns. An inherent difficulty with froth flotation alone is its inability to remove larger particles. The result is that by subjecting the stream to a rotating screen process which has been adapted to operate also as an aerator for a froth flotation process, both the larger particles and the smaller particles are removed. Such a result can be accomplished without a great increase in operating or equipment cost over the use of rotating screen separators alone.

Although the rotating screen separator by its very nature creates a certain amount of froth, this frothing ability can be enhanced by this invention which adapts such separators to make use of their aerating capability. The frothing potential of rotating screen separators may be used to advantage and can be enhanced by various methods. One such method is to introduce a stream of air into the influent just before it passes into the rotating screen separator. Another method is to add a series of vanes on the rotating screen cage to increase air circulation. Additionally, such methods of adding air, or ensuring an adequate supply of air into the apparatus, enable an increase in the dissolved oxygen (as distinguished from the entrained oxygen which creates the froth) which enhances the life-sustaining and aerobic digestion qualities of the effluent.

Chemical means known to be useful for froth flotation may also be combined with the influent. It is also possible to combine the dissolved air flotation system described above with the present concepts. This combination comprises feeding a source of waste water which has been held under about 50 p.s.i.g. into the influent stream.

An example of another application of the present screening aerator is for effluent treatment. In this regard it can remove substantially all objectionable floating material; remove significant amounts of total suspended solids; remove oils and grease; concentrate and remove ABS (alkyl-benzene-sulfonate) and other foamers to provide a foam free final effluent; reduce turbidity; increase the dissolved oxygen, as noted above, which typically doubles, as from 4 to 8 p.p.m.; reduce chlorine demand; and decrease chlorination retention time requirement.

BRIEF DESCRIPTION OF THE DRAWINGS

The drawing is a perspective view, partially cut away, of the apparatus of the present invention.

DESCRIPTION OF THE PREFERRED EMBODIMENTS

Turning now to FIG. 1, there is illustrated a substantially cylindrical housing 10 upon which is mounted an enclosed driving mechanism comprising an electric motor (not shown) enclosed in a housing 11. A rotating screen cage 12 is held from above by a shaft 13 which is mounted along the axis of the rotating screen cage 12. The shaft is turned by the electric motor through belts in a conventional manner. The screen cage is open at its bottom end and may be closed at its top end by cover plate 15.

The screen cage is driven in the direction of arrow 20 by the driving mechanism. The housing 11 is provided with air intake vents 21, or any other suitable venting arrangement to enable unobstructed entry of large amounts of air to the inside of the housing. As the screen cage 12 rotates, it acts as a centrifugal blower creating a pressure differential between the axis of the rotating cage 12 and its outer surface. This creates a flow of air through air intake vents 21 into the housing and out of a screen effluent outlet 22. This flow of air may be increased, if desired, by the addition of vanes 23 along the top of rotating screen cage 12, or by any other suitable arrangement.

Rotating screen cage 12 contains a series of removable screen panels such as those indicated at 24 and 25. Screen panels 25 are covered with screening chosen from a material capable of withstanding the abrasion of waste water influent as well as its corrosive effect. It has been found that stainless steel screening is effective although synthetic fabrics may also be used. Exemplary screen fabric is stainless steel 165 mesh tensile bolting cloth providing 47% open area and having 105 micron openings. Another example is stainless steel 325 mesh, market grade, with 44 micron openings.

An influent feed pipe 30 is fed a stream of unscreened waste water. Preferably the unscreened waste water has been passed over a bar rack with one-half inch clear openings to remove large objects. As the waste water enters the interior of rotating screen cage 12, it flows over a distribution dome 31. A deflection plate, not shown, may be held above the outlet 32 of influent feed pipe 30. The deflection plate may be a circular substantially flat plate (or preferably flat with a downwardly extending rim) which can be either attached to the feed pipe 30 or supported from above by the top of the rotating screen cage 12. This deflection plate is described in the above-mentioned application Ser. No. 210,179 which has been incorporated by reference and it creates an annular opening at the outlet 36 of pipe 30. The use of the deflection plate is advantageous, however, and it may be used to increase the outward force of the stream of waste water across dome 31, and may be adjustable with respect to the outlet 36 of the pipe to vary said annular opening and thus the flow rate of influent toward the distributor 31.

After the waste water flows outwardly across dome 31, it impinges against the inner surface of panels 25. A portion of the waste water will pass througgh the screen panels 25 and fall into the bottom of the housing 10 and out of the screened effluent outlet 22. Those particles in the waste water stream which are too large to pass through the screen will fall down the inner surface of the screen into the concentrate chamber 32 and from there through concentrate outlet pipe 33.

The separation efficiency of the separator may be improved by providing a splash-back chamber 34 having an outlet 35. A certain amount of influent will neither pass through the screen panels 25 nor fall down their inner surface. This material is not significantly classified since it generally has simply splashed back from the supports between screen panels or from solid matter moving down the inside of the panels. This material is caught in the splash-back chamber and may be returned to the influent feed for further separation. This material may also be added to the concentrate effluent if it is desired to increase the volume of this stream.

That portion of the influent stream which passes through the screen panels tends to be broken up into a finer spray or froth simply by the passage through the screen panel. As discussed above, the rotating screen cage tends to act as a centrifugal blower and causes a flow of air to be mixed with the broken up effluent which is passed through the screen panels 25. The result is the contact of liquid with a large surface area in contact with a substantial flow of air. This causes a substantial frothing or foaming effect of the screened effluent as it falls into the chamber created by housing 10.

A pair of troughs are provided to collect the two streams. Trough 40 collects the screened effluent together with the froth effluent which has passed through outlet 22. Trough 41 collects the concentrate leaving pipe 33. The screened and frothed effluent as it falls into trough 40 separates into a froth layer and a liquid layer as it passes along trough 40. The bubbles rise through the screened effluent ant trap oil and many small waste particles which pass through the screen panels 25. A surface skimmer 42 is maintained with its lower end slightly below the surface of the liquid level in trough 40. In this way the froth is forced through by-pass trough 43 into concentrate trough 41. The bottom of by-pass trough 43 should not be substantially below the liquid level of the concentrate in trough 41. The bottom of by-pass trough 43 should not be substantially below the liquid level of the screend effluent in trough 40 in order to prevent or reduce the flow of screened effluent into the concentrate trough 41. Under some conditions, when it is desirable to increase the liquid volume of the concentrate, some flow of screened effluent may be desirable, in which case the liquid level in trough 40 can be raised to increase the flow of screened effluent through by-pass trough 43 into trough 41.

The resulting final effluent downstream of surface skimmer 42 has been subjected to two separation treatments. First, it is passed through screen panels 25 which remove larger particles. Second, it is subjected to a froth flotation step which removes a portion of the finer particles together with a substantial portion of the oil. Where the condition of the influent requires, this screen effluent may be disinfected by known means such as chlorination or ozonation. It is only necessary to subject the concentrate stream to treatment in a sewage disposal plant and thus treatment facilities are not overloaded by the volume of waste water to be treated.

Alternatively, the froth in the trough 43, which is generally more concentrated than the concentrate in trough 41, may be processed separately rather than combining the same with the concentrate.

The operating conditions of such a concentrator are dependent upon the size of the rotating screen. It has been found desirable to operate the rotating screen cage at a speed which causes a substantial amount of the waste water to pass through screen panels 25 while at the same time does not trap concentrate particles against the inner screen surface by centrifugal force. Thus if the screen rotation is too slow, only a small amount of screened effluent will be forced outwardly through the screen panels 25. Conversely, if it is operated at too high a rate of rotation, the inner surface of screen panels 25 will become quickly plugged with waste held against their inner surface.

It has been found that an outward centrifugal force of about three times the force of gravity (3$g$'s) is particularly effective. The relationship between screen cage diameter, rotation speed and outward centrifugal force is as follows:

$$g \text{ force} = 2.85r \text{ (r.p.m.)}^2 \times 10^{-5}$$

where:

$g$ force = the relative outward centrifugal force as compared to the force of gravity.
$r$ = radius of rotating screen cage in inches.
r.p.m. = speed of rotation of screen cage, in revolutions per minute.

A typical screen rotation speed for a 60 inch diameter screen would be 65 r.p.m. and that for a 36 inch diameter screen would be 88 r.p.m. Since the optimum $g$ force will be influenced by the screen size as well as its relative height, $g$ forces between 1 and 7 may be useful and preferably closer to 3$g$'s.

The flotation efficiency may be increased by feeding a stream of air into the influence prior to the time the influent impinges against the screen panels. This may be done simply by feeding air under pressure into a pipe whose outlet is in the influent stream. Such a pipe is shown by reference character 50 in the drawings. Further, this system may be combined with a dissolved air flotation step. As known to those skilled in the art, the dissolved air process comprises holding waste water and air in intimate contact under pressure, such as 50 p.s.i., followed by the released of that pressure. The result is that a large number of bubbles form in the water and rise to the surface as a froth. Thus if waste water which has been held under pressure is fed into the influent stream a greater amount of frothing results.

Flotation efficiency may also be enhanced by the addition of froth regulating chemicals such as activators, depressants, dispersants, flocculants, pH regulators, collectors, modifiers and frothers. For instance, it has been found that the use of minute quantities of a synthetic coagulant such as the liquid polyamine compound sold under the trade name ST–266 made by the Calgon Corporation will significantly increase the efficiency of small particle removal from the effluent stream.

The addition of waste water containing dissolved air or a stream of air through pipe 50 is believed to create an additional benefit which further increases separation efficiency. The resulting air in the influent creates a large number of bubbles which gather particles along their surface. These particles when attached to air bubbles seem to behave as though they were considerably larger than their actual size. Since this effect takes place upsteam of the screen, the screen removes the particles entrapped by bubbles which would otherwise pass through the screen. The concentrate outlet thus also may contain some froth which contains small suspended particles.

Various means may be utilized to separate the froth from the effluent stream. It is advantageous that the froth be separated as soon as possible to minimize the breaking up of the froth and the deposition of the particles into the screened effluent stream. The surface skimmers can be mounted on an endless belt and used to move the froth from the effluent trough to the concentrate trough before any substantial amount of the froth has broken up.

A rotating screen separator having a screen cage diameter of about five feet and a height of about two feet was combined with a froth removing system similar to that illustrated in FIG. 1. The rotating screen employed 18 removable screen panels on a revolving screen cage. The screen was rotated at 65 revolutions per minute. An influent feed rate of three million gallons per day was fed into this apparatus which divided this influent into two streams. The first stream contained about 95% of the volume of the influent and was a relatively waste-free stream. The second stream comprising about 5% of the influent contained greater than 99% of the influent settleable solids. A sample of the froth from the effluent stream contained oils, grease and finely-divided solids which had passed through the rotating screen.

Other means for distributing the waste water stream against the interior of the rotating screen cage may be used. It is advantageous to feed the waste water stream in a radial direction inclined in the direction of rotation of the screen cage. Rather than using the distribution dome shown in FIG. 1, the influent may be fed against the screen panels by a series of troughs or pipes located in the interior of the screen cage. The waste water stream is preferably fed against the interior of the screen surface at a velocity of typically about three to fourteen feet per second. An optimum velocity may vary somewhat with screen mesh size as well as screen diameter and a typical exemplary velocity is about six feet per second with 165 or 325 mesh TBC screen panels. The waste water influent may be fed to the concentrator directly from a feed pump or indirectly through a head tank. The head tank helps to maintain a constant influent stream pressure.

Means for periodically washing the screen panels may be provided as shown in application Ser. No. 42,099 which has been incorporated by reference herein. The above described process may be extensively automated so that it can operate unattended through extended storm periods.

Although this apparatus has been shown to be particularly effective for use in separating water from a combined sewage storm drain system and in screening sanitary treatment plant secondary effluent, it is also effective in other processes which require the removal of solid waste from a liquid stream. Many such applications exist in the chemical processing industries and the pulp and paper industry. Accordingly, the present embodiments of this invention are to be considered in all respects as illustrative and not as restrictive, the scope of the invention being indicated by the appended claims rather than by the foregoing description. All changes which come within the meaning and range of equivalency therefore are intended to be embraced therein.

What is claimed is:

1. In a concentrator of the type having a rotating screen cage with screens which separate an influent into a waste-containing concentrate and a relatively waste-free effluent stream comprising means within the concentrator and distinct from the screens of the rotating screen cage for aerating the influent so that air can intimately mix with the flow of influent as it passes through the screen cage to form a froth in said effluent, conduit means for receiving said effluent, surface skimmer means mounted adjacent said conduit means to remove froth from the surface of said effluent, and conduit means for receiving said froth.

2. The concentrator of claim 1 wherein said surface skimmer means comprises a froth impervious plate extending below the liquid surface of said waste-free effluent stream and extending above said liquid surface at a height sufficient to prevent the flow of froth over said plate.

3. An apparatus as defined in claim 1 wherein said means within the concentrator includes vanes attached in a fixed relationship with respect to said rotating screen cage.

4. An apparatus as defined in claim 1 wherein said means within the concentrator includes means for providing a stream of air to said influent.

5. The concentrator of claim 4 wherein said means within the concentrator comprises an air conduit having an air outlet communicating with said influent stream.

6. A process for concentrating waste water including the steps of passing a waste-containing influent outwardly into the interior of screen means of a concentrator, wherein the screen means has a screen cage with a plurality of screen panels therein, while imparting relative motion between the feed of influent and said screen means, supplying air within said concentrator, distinct from the action of the screens of the screen means, for aerating the influent so that air will mix with the influent as it passes through the screens of said screen means, collecting the relatively waste-free effluent stream which passes outwardly through the screen means and collecting a waste-containing concentrate stream, and separating a froth from the surface of said effluent.

7. The process of claim 6 including the additional step of adding froth regulating chemicals to said influent stream.

8. A process for separating a solids-containing liquid influent stream into a relatively solids-free effluent stream and a solids-containing concentrate stream comprising feeding said solids-containing liquid influent stream through a rotating screen of a concentrator to separate said solids-containing liquid influent stream into a relatively solids-free effluent stream which passes through said screen and into a concentrate stream which substantially flows from the surface of said screen on which said effluent impinges, and simultaneously therewith entraining air by the rotating action of said screen for thereby aerating the influent so that air will mix with the influent as it passes through said screen and have a froth, and conveying at least a portion of said froth from the effluent stream to said concentrate.

9. A process as in claim 8 wherein additional air is supplied to said solids-containing liquid influent stream distinct from the aeration action of said rotating screen.

10. A waste water concentrator comprising a housing, a rotating screen cage mounted within said housing for separating an influent into a solids-containing concentrate and a relatively solids-free effluent stream, said screen cage having screens with a significant open area to enable the rotating screen cage to aerate the influent so that air will mix with the influent as it passes through said screens, and means distinct from said screen cage for increasing the amount of air within the concentrator for increasing the amount of entrained and dissolved oxygen in said effluent stream.

11. A concentrator as in claim 10 wherein said means comprises vane means attached to said rotating screen cage.

12. A concentrator as in claim 10 wherein said means comprises air feed means for supplying air into said concentrator.

References Cited
UNITED STATES PATENTS

| | | | |
|---|---|---|---|
| 2,230,385 | 2/1941 | Pecker | 210—44 X |
| 2,056,885 | 10/1936 | Pecker | 210—375 |
| 3,087,710 | 4/1963 | Dujardin | 210—44 X |

FOREIGN PATENTS

| | | | |
|---|---|---|---|
| 752,099 | 7/1956 | Great Britain | 210—44 |

MICHAEL ROGERS, Primary Examiner

U.S. Cl. X.R.

209—164, 270; 210—73, 78, 221